(12) United States Patent
Greene et al.

(10) Patent No.: US 9,546,003 B2
(45) Date of Patent: Jan. 17, 2017

(54) DEFLARE PITCH COMMAND

(71) Applicant: Safe Flight Instrument Corporation, White Plains, NY (US)

(72) Inventors: Randall A. Greene, White Plains, NY (US); Shawn P. Beyer, New York, NY (US)

(73) Assignee: SAFE FLIGHT INSTRUMENT CORPORATION, White Plains, NY (US)

(*) Notice: Subject to any disclaimer, the term of this patent is extended or adjusted under 35 U.S.C. 154(b) by 149 days.

(21) Appl. No.: 14/213,967

(22) Filed: Mar. 14, 2014

(65) Prior Publication Data

US 2016/0159494 A1    Jun. 9, 2016

(51) Int. Cl.
| | |
|---|---|
| *B64D 45/00* | (2006.01) |
| *G02B 27/01* | (2006.01) |
| *G05D 1/08* | (2006.01) |
| *B64C 13/00* | (2006.01) |
| *B64D 45/04* | (2006.01) |
| *B64C 19/00* | (2006.01) |
| *B64C 17/00* | (2006.01) |
| *G08G 5/02* | (2006.01) |
| *G08G 5/00* | (2006.01) |

(52) U.S. Cl.
CPC ........... *B64D 45/00* (2013.01); *G05D 1/0808* (2013.01); *G05D 1/0816* (2013.01); *B64C 13/00* (2013.01); *B64C 17/00* (2013.01); *B64C 19/00* (2013.01); *B64D 45/0005* (2013.01); *B64D 45/04* (2013.01); *B64D 2045/008* (2013.01); *G02B 27/01* (2013.01); *G08G 5/0047* (2013.01); *G08G 5/02* (2013.01); *G08G 5/025* (2013.01)

(58) Field of Classification Search
CPC ....... G02B 27/01; G01C 23/00; G01C 23/005; G01C 9/005; G05D 1/0808; G05D 1/0816; B64C 13/00; B64C 17/00; B64C 19/00; B64D 45/00; B64D 45/0005; B64D 45/04; B64D 2045/008; G08G 5/02; G08G 5/025; G08G 5/0047
USPC .................. 701/3, 4, 5, 6, 7, 8, 9, 10, 14, 16
See application file for complete search history.

(56) References Cited

U.S. PATENT DOCUMENTS

| | | | |
|---|---|---|---|
| 3,291,421 A | * | 12/1966 | Kramer ................ G05D 1/0676 244/186 |
| 3,665,465 A | | 5/1972 | Miller |
| 3,691,356 A | | 9/1972 | Miller |
| 3,712,122 A | * | 1/1973 | Harris .................. G01L 5/0052 340/945 |
| 3,805,033 A | | 4/1974 | Manke et al. |
| 3,934,221 A | | 1/1976 | Bateman et al. |

(Continued)

OTHER PUBLICATIONS

International Search Report and Written Opinion for PCT/US2013/68580, mailed Jul. 11, 2014, 14 pages.

*Primary Examiner* — Thomas G Black
*Assistant Examiner* — Sara Lewandroski
(74) *Attorney, Agent, or Firm* — Morrison & Foerster LLP

(57) ABSTRACT

A pitch command display method includes identifying touchdown of an aircraft, identifying a first value representing an actual pitch reduction rate of the aircraft, identifying a second value representing a target pitch reduction rate of the aircraft, determining a difference between the first value and the second value, and displaying a pitch command when the difference between the first value and second value is greater than a threshold amount and the aircraft has touched down.

98 Claims, 5 Drawing Sheets

(56) References Cited

U.S. PATENT DOCUMENTS

| | | |
|---|---|---|
| 3,936,797 A | 2/1976 | Andresen |
| 3,994,455 A | 11/1976 | Simpson |
| 4,092,716 A * | 5/1978 | Berg ................... F41G 5/26 |
| | | 244/195 |
| 4,319,218 A | 3/1982 | Bateman |
| 4,373,184 A * | 2/1983 | Lambregts ............ B64C 13/503 |
| | | 244/196 |
| 4,431,994 A | 2/1984 | Gemin |
| 4,536,843 A | 8/1985 | Lambregts |
| 4,551,723 A | 11/1985 | Paterson |
| 4,675,823 A | 6/1987 | Noland |
| 4,764,872 A | 8/1988 | Miller |
| 5,020,747 A | 6/1991 | Orgun et al. |
| 5,031,102 A | 7/1991 | Robbins et al. |
| 5,038,141 A | 8/1991 | Grove |
| 5,187,478 A | 2/1993 | Grove |
| 5,220,322 A | 6/1993 | Bateman et al. |
| 5,402,116 A | 3/1995 | Ashley |
| 5,406,487 A * | 4/1995 | Tanis ................... G05D 1/0676 |
| | | 701/15 |
| 5,781,126 A | 7/1998 | Paterson et al. |
| 5,901,927 A * | 5/1999 | Ho ....................... G05D 1/0607 |
| | | 244/183 |
| 6,121,899 A * | 9/2000 | Theriault ............... G01C 23/00 |
| | | 340/946 |
| 6,186,447 B1 | 2/2001 | Virdee |
| 6,216,064 B1 | 4/2001 | Johnson et al. |
| 6,422,517 B1 | 7/2002 | DeWitt et al. |
| 6,462,703 B2 | 10/2002 | Hedrick |
| 6,507,289 B1 | 1/2003 | Johnson et al. |
| 6,711,479 B1 | 3/2004 | Staggs |
| 6,761,336 B2 | 7/2004 | DeWitt et al. |
| 6,845,304 B1 | 1/2005 | Young |
| 6,940,427 B2 * | 9/2005 | Bateman ..................... 340/967 |
| 6,999,023 B2 | 2/2006 | Block |
| 7,088,264 B2 | 8/2006 | Riley |
| 7,725,220 B2 | 5/2010 | Petrich et al. |
| 8,027,756 B2 | 9/2011 | Davis et al. |
| 8,126,600 B2 | 2/2012 | Conner et al. |
| 8,175,763 B2 * | 5/2012 | Yamane ................. B64C 13/18 |
| | | 244/180 |
| 8,321,071 B2 | 11/2012 | Klooster |
| 8,478,458 B2 | 7/2013 | Faurie et al. |
| 8,494,693 B2 | 7/2013 | Murphy |
| 8,630,756 B2 | 1/2014 | Fleiger-Holmes et al. |
| 8,660,722 B2 | 2/2014 | Dumoulin et al. |
| 8,723,695 B2 | 5/2014 | Bourret et al. |
| 8,788,128 B1 | 7/2014 | McCusker |
| 8,831,799 B1 * | 9/2014 | Levine ................. G05D 1/0676 |
| | | 244/183 |
| 8,903,572 B1 * | 12/2014 | Hagelin .................. B64D 45/00 |
| | | 244/100 R |
| 2001/0052562 A1 * | 12/2001 | Ishihara ............... G05D 1/0676 |
| | | 244/175 |
| 2002/0030607 A1 * | 3/2002 | Conner ................... B64C 27/82 |
| | | 340/945 |
| 2002/0075171 A1 | 6/2002 | Kuntman et al. |
| 2002/0077731 A1 | 6/2002 | Hilb |
| 2003/0016145 A1 * | 1/2003 | Bateman ................ B64D 43/02 |
| | | 340/967 |
| 2003/0093187 A1 | 5/2003 | Walker |
| 2003/0206119 A1 | 11/2003 | Riley |
| 2004/0057177 A1 | 3/2004 | Glahn |
| 2004/0070521 A1 | 4/2004 | Greene |
| 2006/0041345 A1 | 2/2006 | Metcalf |
| 2006/0052912 A1 | 3/2006 | Meunier |
| 2006/0195235 A1 | 8/2006 | Ishihara |
| 2006/0220921 A1 | 10/2006 | Foucart |
| 2006/0271249 A1 | 11/2006 | Testrake et al. |
| 2007/0239326 A1 | 10/2007 | Johnson et al. |
| 2008/0243316 A1 | 10/2008 | Sacle et al. |
| 2009/0138144 A1 | 5/2009 | Flannigan et al. |
| 2009/0207047 A1 * | 8/2009 | Ross, III ............ B64D 45/0005 |
| | | 340/960 |
| 2009/0262008 A1 | 10/2009 | Thomas et al. |
| 2011/0029158 A1 | 2/2011 | Klooster |
| 2011/0077858 A1 | 3/2011 | Coulmeau |
| 2011/0098967 A1 * | 4/2011 | Khial ................... G05D 1/0066 |
| | | 702/141 |
| 2011/0251740 A1 | 10/2011 | Gomez Ledesma et al. |
| 2011/0276217 A1 * | 11/2011 | Sim ........................ B64D 45/00 |
| | | 701/31.4 |
| 2012/0053760 A1 | 3/2012 | Burnside et al. |
| 2012/0056770 A1 | 3/2012 | Bourret et al. |
| 2012/0095625 A1 | 4/2012 | Ishihara et al. |
| 2012/0191273 A1 * | 7/2012 | Jacobs ................ H04B 7/18508 |
| | | 701/3 |
| 2012/0265374 A1 | 10/2012 | Yochum |
| 2012/0316706 A1 | 12/2012 | Guedes |
| 2013/0030614 A1 * | 1/2013 | Ding ....................... G07C 5/085 |
| | | 701/16 |
| 2013/0245982 A1 | 9/2013 | Buchanan |
| 2013/0274964 A1 | 10/2013 | Jesse et al. |
| 2014/0074326 A1 | 3/2014 | Pereira |
| 2014/0090471 A1 | 4/2014 | Hsu |
| 2014/0129058 A1 | 5/2014 | Elahi |
| 2014/0172202 A1 | 6/2014 | Greene |
| 2014/0229056 A1 * | 8/2014 | Catt ....................... B64F 5/0045 |
| | | 701/31.9 |
| 2015/0120098 A1 * | 4/2015 | Catalfamo ............... G08G 5/02 |
| | | 701/16 |
| 2015/0120099 A1 * | 4/2015 | Herbert .............. B64D 45/0005 |
| | | 701/16 |
| 2015/0123821 A1 * | 5/2015 | Greene .................. B64D 45/04 |
| | | 340/967 |

* cited by examiner

DEFLARE PITCH COMMAND

FIELD OF THE DISCLOSURE

This disclosure generally relates to systems and methods for landing an aircraft. More particularly, this disclosure relates to systems and methods for displaying a pitch command after an aircraft has touched down and systems and methods for providing bounce recovery instructions.

BACKGROUND

During landing, an aircraft's pitch may be increased to slow its descent. This maneuver is typically called "flaring" the aircraft. When an aircraft is flared, it is typically deflared after touchdown. Aircraft accidents and cargo damage are frequently caused by incorrectly executed deflares.

Overzealous pitch reduction during deflare may result in aircraft or cargo damage. By contrast, when pitch reduction rate is too slow, the aircraft may be unable to safely land within the length of the runway.

Inexperienced pilots may sometimes have difficulty judging the correct rate of pitch reduction. Even experienced pilots may have difficulty when landing larger aircraft.

Poorly executed landings may also "bounce" an aircraft. A bounce may result when the aircraft approaches the runway at improper attitude, approaches at an improper rate of sink, and/or has a sudden increase in angle of attack. A bounce may force the entire aircraft back into the air or may cause the nose of the aircraft to oscillate up and down.

In some cases, experienced pilots may be able to salvage the landing by properly adjusting pitch. In other cases, the only solution is to execute a "go-around."

SUMMARY

This disclosure relates to systems and methods for displaying a pitch command after an aircraft has touched down. Advantageously, the systems and methods may reduce deflare-related accidents.

In one embodiment, a pitch command display method includes identifying touchdown of an aircraft, identifying a first value representing an actual pitch reduction rate of the aircraft, identifying a second value representing a target pitch reduction rate of the aircraft, determining a difference between the first value and the second value, and displaying a pitch command when the difference between the first value and second value is greater than a threshold amount and the aircraft has touched down. The method may advantageously reduce deflare accidents by reducing reliance on pilot skill to deflare at a safe pitch reduction rate.

In some embodiments, displaying the pitch command may include displaying the command on a heads-up display or a primary flight display. In some embodiments, identifying touchdown may include determining that the aircraft's landing gear has contacted a runway. In some embodiments, the target pitch reduction rate may be 1 degree per second. In some embodiments, the pitch command may be a nose-down pitch command. In some embodiments, the method may include identifying nose gear contact with the runway and discontinuing display of the pitch command when nose gear contact is identified. In some embodiments, the second value may change after aircraft touchdown is identified and before nose-gear contact with the runway is identified.

In some embodiments, identifying the second value may include identifying at least one of aircraft flap position, aircraft slat position, and aircraft spoiler position. In some embodiments, the method may include identifying an elapsed time since aircraft touchdown and displaying the pitch command may include displaying the pitch command when the elapsed time is identified.

In one embodiment, a pitch command display system includes a first module, a second module, a third module, a pitch command module, and a display. The first module may identify touchdown of the aircraft. The second module may identify actual pitch reduction of the aircraft. The third module may identify a target pitch reduction rate of the aircraft. The pitch command module may determine a difference between the actual pitch reduction rate and the target pitch reduction rate, and provide a pitch command when the difference is greater than a threshold amount and the aircraft has touched down. The display may provide the pitch command. The system may advantageously reduce deflare accidents by reducing reliance on pilot skill to deflare at a safe pitch reduction rate.

In some embodiments, the display includes a heads-up display or a primary flight display. In some embodiments, the first module may identify when the aircraft's landing gear has touched a runway. In some embodiments, the target pitch reduction rate is 1 degree per second. In some embodiments, the pitch command is a nose-down pitch command. In some embodiments, a fourth module may identify when the nose gear has made contact with the runway and the pitch command module may discontinue the pitch command. In some embodiments, the third module may identify at least two target aircraft pitch reduction rates after the first module identifies an aircraft touchdown and before the fourth module identifies the nose-gear has made contact with the runway.

In some embodiments, the third module may identify the target aircraft pitch reduction rate by identifying at least one of an aircraft flap position, an aircraft slat position, and an aircraft spoiler position. In some embodiments, a fifth module may identify an elapsed time since aircraft touchdown, and the display may display the pitch command after the fifth module identifies the elapsed time.

This disclosure also relates to systems and methods for providing bounce recovery instructions. Advantageously, the systems and methods may reduce bounce-related accidents by removing reliance on pilot skill to recover from a bounce condition.

In one embodiment, a method includes identifying an aircraft bounce, determining a bounce severity, displaying a bounce recovery instruction based on the bounce severity, the bounce recovery instruction indicating that aircraft pitch should be maintained or that aircraft pitch should be altered, identifying a bounce recovery, and discontinuing display of the bounce recovery instruction.

In some embodiments, identifying an aircraft bounce includes at least one of: detecting an increase in aircraft acceleration, detecting an upward aircraft speed, detecting an increase in aircraft altitude, and detecting a loss of contact between an aircraft landing gear and a runway.

In some embodiments, determining a bounce severity includes determining at least one of: an aircraft acceleration in excess of an acceleration threshold, an upward aircraft speed in excess of a speed threshold, and an increase in aircraft altitude in excess of an altitude threshold.

In some embodiments, identifying a bounce recovery includes one of detecting a go-around maneuver and detecting contact between an aircraft landing gear and a runway.

In some embodiments, the method includes providing a pitch command after identifying a bounce recovery.

In some embodiments, displaying the bounce recovery instruction includes displaying the instruction on a heads-up display or a primary flight display. In some embodiments, displaying the bounce recovery instruction includes displaying a go-around instruction.

In one embodiment, an aircraft bounce recovery system includes a first module that identifies an aircraft bounce, a second module that determines a bounce severity, a third module that determines a bounce recovery instruction based on the bounce severity, the bounce recovery instruction indicating that aircraft pitch should be maintained or that aircraft pitch should be altered, a fourth module that identifies a bounce recovery, and a display that displays the instruction and discontinues display of the instruction when the fourth module identifies a bounce recovery.

In some embodiments, the first module detects at least one of: an increase in aircraft acceleration, an upward aircraft speed, an increase in aircraft altitude, or a loss of contact between an aircraft landing gear and a runway.

In some embodiments, the second module determines at least one of: an aircraft acceleration in excess of an acceleration threshold, an upward aircraft speed in excess of a speed threshold, and an increase in aircraft altitude in excess of an altitude threshold.

In some embodiments, the fourth module detects at least one of a go-around maneuver and contact between an aircraft landing gear and a runway.

In some embodiments, the system includes a fifth module that displays a pitch command after the fourth module identifies a bounce recovery.

In some embodiments, the display includes a heads-up display or a primary flight display.

In some embodiments, the bounce recovery instruction includes a go-around instruction.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

In some embodiments, a pitch command is displayed after an aircraft has touched down. Advantageously, the systems and methods may reduce deflare-related accidents.

Figure 1:
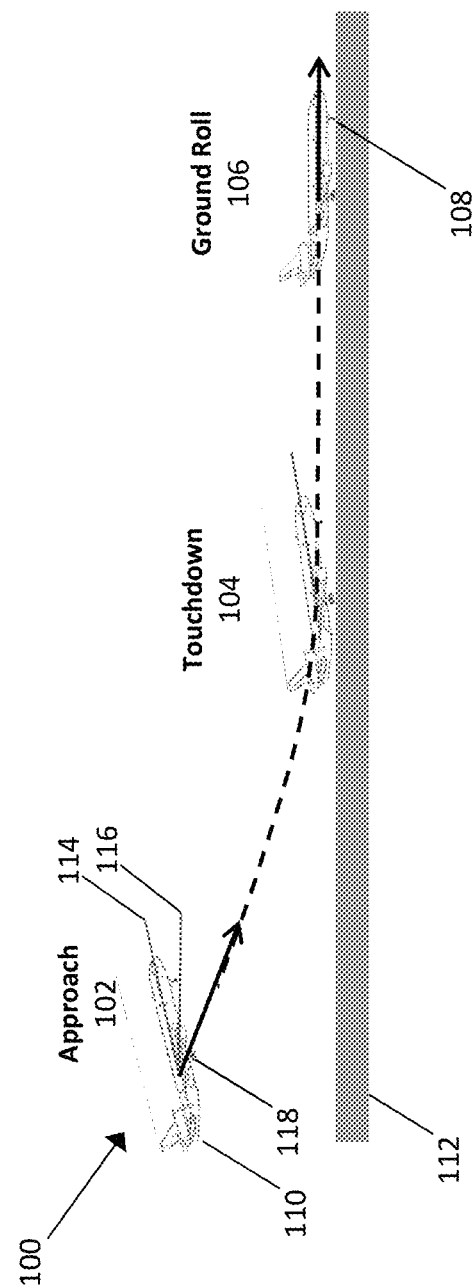
FIG. 1 depicts a sequence of an aircraft landing on a runway, in accordance with an embodiment

FIG. 1 depicts a sequence 100 of an aircraft 110 landing on a runway 112, in accordance with an embodiment. FIG. 1 illustrates three stages of the landing sequence: approach 102, touchdown 104, and ground-roll 106.

During approach 102, the pitch of aircraft 110 may be increased. As used herein, an aircraft's pitch can be understood to include the angle between a reference line (for example, the chord line, identified as 114 in FIG. 1) of the aircraft and the horizontal 116. This increase in pitch may be termed a flare and may serve to slow the descent of the aircraft during a landing maneuver.

At touchdown 104, the landing gear 118 touches the runway 112. At this time, the flare may be reversed (the plane is "deflared") by lowering the nose of the aircraft and reducing the aircraft's pitch to zero.

Ground roll stage 106 illustrates the aircraft at zero pitch, after deflare. The aircraft's nose gear 108 is now contacting the runway.

Figure 2:
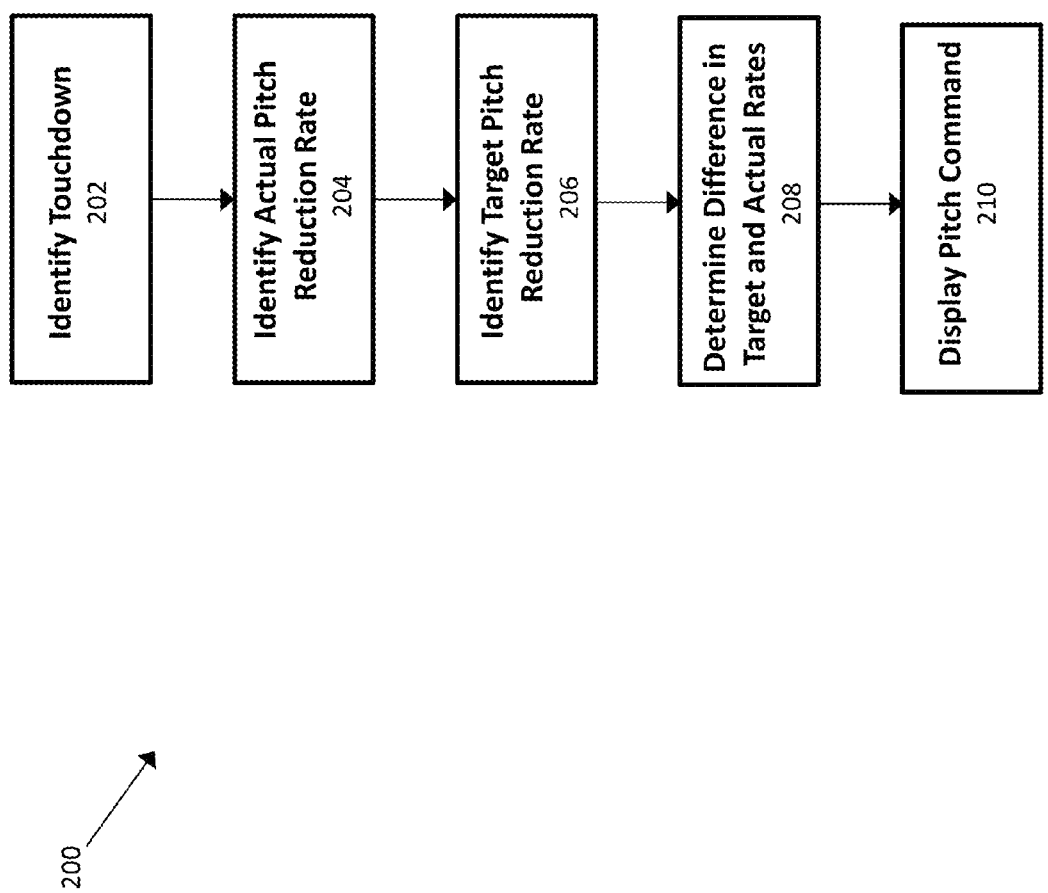
FIG. 2 depicts a method for displaying a pitch command, in accordance with an embodiment.

FIG. 2 depicts a method 200 for displaying a pitch command, in accordance with an embodiment. The pitch command may aid the pilot in maneuvering the aircraft from the touchdown stage to the ground roll stage illustrated in FIG. 1.

Method 200 includes identifying touchdown of an aircraft 202. In some embodiments, touchdown of an aircraft may be the moment when the landing gear of the aircraft first contacts the runway. In other embodiments, it may be an offset from the moment the landing gear first contact the runway, such as a few seconds before or after.

In some embodiments, aircraft touchdown may be determined using a sensor connected to landing gear of the aircraft. In some embodiments, aircraft touchdown may be determined using an altimeter.

Method 200 also includes identifying an actual pitch reduction rate of the aircraft 204. The pitch reduction rate may be understood to be the decrease in pitch angle of the aircraft over time. Thus, pitch reduction rate may be positive when the pitch of the aircraft is decreasing. The pitch of the aircraft may be determined using a gyroscope or similar device for sensing the attitude of the aircraft.

Method 200 includes identifying a target pitch reduction rate of the aircraft. In some embodiments, the target pitch reduction rate may be one degree per second. In some embodiments, the target pitch reduction rate may be constant for all landings. In some embodiments, the target pitch reduction rate may be determined based on characteristics of a landing, such as aircraft size, aircraft type, cargo, runway length, and atmospheric conditions, for example. In some embodiments, the target pitch reduction rate may be determined based on aircraft configuration, such as aircraft flap position, aircraft slat position, or aircraft spoiler position. In some embodiments, the target pitch reduction rate may be constant after touchdown is identified. In other embodiments, the target pitch reduction rate may change after touchdown is identified but before deflare is complete. For example, a target pitch reduction rate may transition from zero when touchdown is identified, to a maximum value during deflare, and then to zero again when deflare is complete.

Method 200 lists the steps of identifying touchdown, actual pitch reduction rate, and target pitch reduction rate in that order. In some embodiments, the steps may be carried out in the order listed in FIG. 2. In other embodiments, the steps may be carried out in a different order.

Method 200 includes determining a difference between the target and actual pitch reduction rates 208. With this information, method 200 determines if the aircraft has touched down and if the difference between the actual and target pitch reduction rates are greater than a threshold amount. If both conditions are met, method 200 then displays a pitch command 210. In some embodiments, the pitch command may not be displayed until a predetermined time has elapsed since touchdown.

In some embodiments, the threshold amount may be a percentage of the target reduction rate. In some embodiments, the threshold amount may be a number of degrees or fraction of a number of degrees. In some embodiments, the threshold amount may be zero (that is, the actual pitch reduction rate equals the target pitch reduction rate).

In some embodiments, the pitch command may be displayed on a heads-up display or a primary flight display. In some embodiments, the pitch command may be a nose-down pitch command.

In some embodiments, method 200 may include identifying nose gear touchdown and discontinuing display of the pitch command when nose gear touchdown is identified. In some embodiments, nose gear touchdown may be determined using a sensor connected to landing gear of the aircraft. In some embodiments, nose gear touchdown may be determined using an altimeter. In some embodiments, identifying nose gear touchdown may correspond to a completed deflare.

Figure 3:
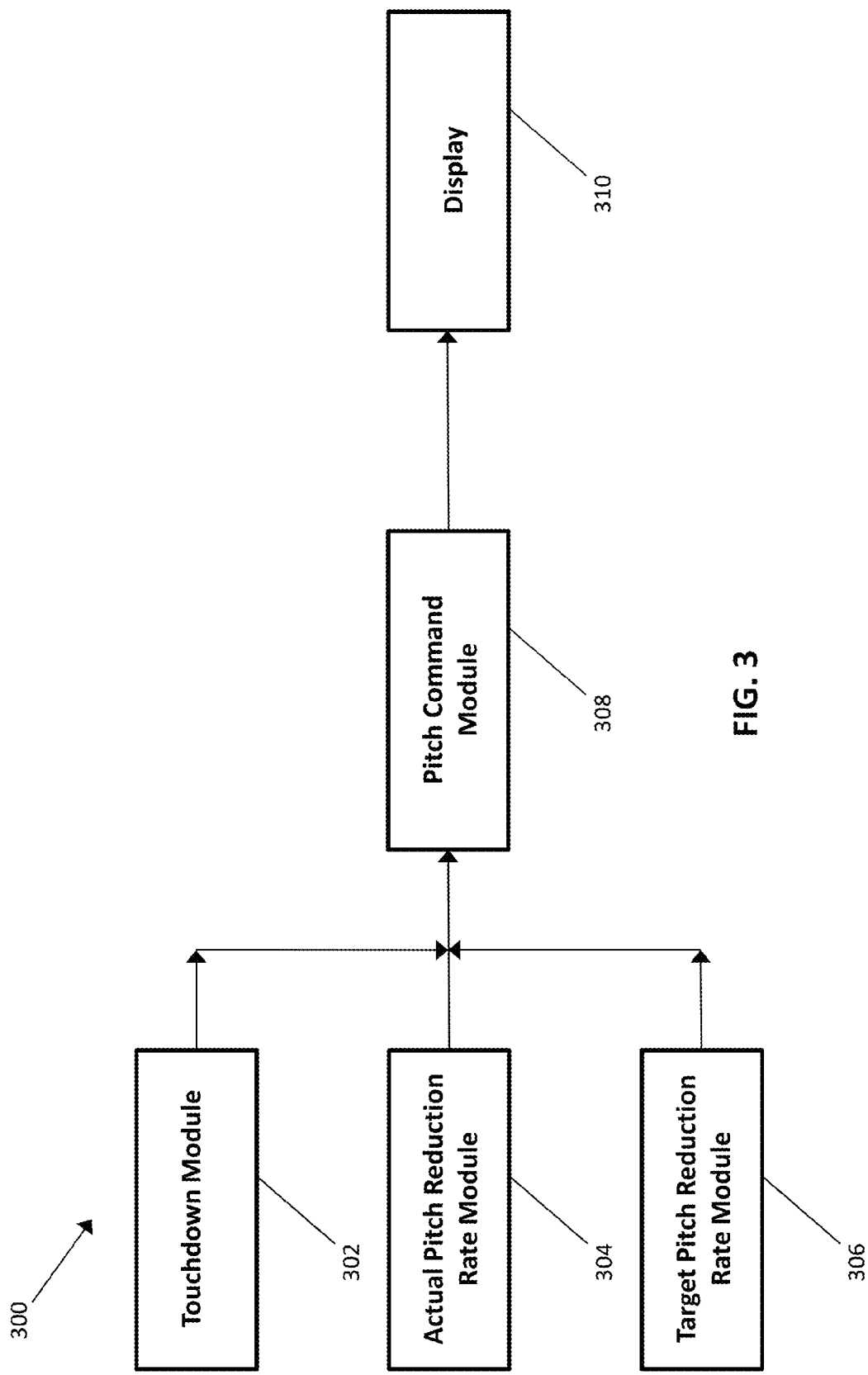
FIG. 3 depicts a pitch command display system, in accordance with an embodiment.

FIG. 3 depicts a pitch command display system 300, in accordance with an embodiment. System 300 may aid a pilot in maneuvering an aircraft from the touchdown stage to the ground roll stage illustrated in FIG. 1.

System 300 includes touchdown module 302, actual pitch reduction rate module 304, target pitch reduction rate module 306, pitch command module 308, and display 310. Touchdown module 302 identifies when the aircraft's landing gear first contacts a runway. In some embodiments, touchdown module 302 may include a sensor connected to the landing gear of the aircraft for determining when the landing gear has touched a runway. In some embodiments, touchdown module 302 may include an altimeter.

Actual pitch reduction rate module 304 identifies the actual (or current) pitch reduction of the aircraft. In some embodiments, actual pitch reduction rate module 304 may include a gyroscope or similar device for sensing the attitude of the aircraft.

Target pitch reduction rate module 306 identifies a target pitch reduction rate of the aircraft. In some embodiments, the target pitch reduction rate may be constant for all landings. In some embodiments, the target pitch reduction rate module 306 may consider characteristics of a landing, such as aircraft size, aircraft type, cargo, runway length, and atmospheric conditions, for example. In some embodiments, the target pitch reduction rate may be determined based on aircraft configuration, such as aircraft flap position, aircraft slat position, or aircraft spoiler position. In some embodiments, the target pitch reduction rate may be constant after touchdown is identified. In other embodiments, the target pitch reduction rate may change after touchdown is identified but before deflare is complete. For example, a target pitch reduction rate may transition from zero when touchdown is identified, to a maximum value during deflare, and then to zero again when deflare is complete. In some embodiments, the target pitch reduction rate may be one degree per second.

Pitch command module 308 receives inputs from the touchdown module 302, actual pitch reduction rate module 304, and target pitch reduction rate module 306. Pitch command module 308 determines a difference between the actual pitch reduction rate and target pitch reduction rate. Pitch command module 308 then determines if the difference is greater than a threshold amount and the aircraft has touched down. If both conditions are met, pitch command module 308 may send a pitch command to display 310.

In some embodiments, display 310 may be a heads-up display or a primary flight display. In some embodiments, pitch command module 308 may send a nose-down pitch command to the display 310. In some embodiments, the pitch command may not be displayed until a predetermined time has elapsed since touchdown.

In some embodiments, system 300 includes an additional module (not shown) that may identify when the aircraft's nose gear contacts the runway and pitch command module 308 may discontinue displaying the pitch command on display 310. In some embodiments, the additional module may include a sensor connected to the nose gear of the aircraft for determining when the nose gear has touched a runway. In some embodiments, the additional module may include an altimeter. In some embodiments, identifying nose gear touchdown may correspond to a completed deflare.

This disclosure also relates to systems and methods for providing bounce recovery instructions. Advantageously, the systems and methods may reduce bounce-related accidents by removing reliance on pilot skill to recover from a bounce condition.

Figure 4:
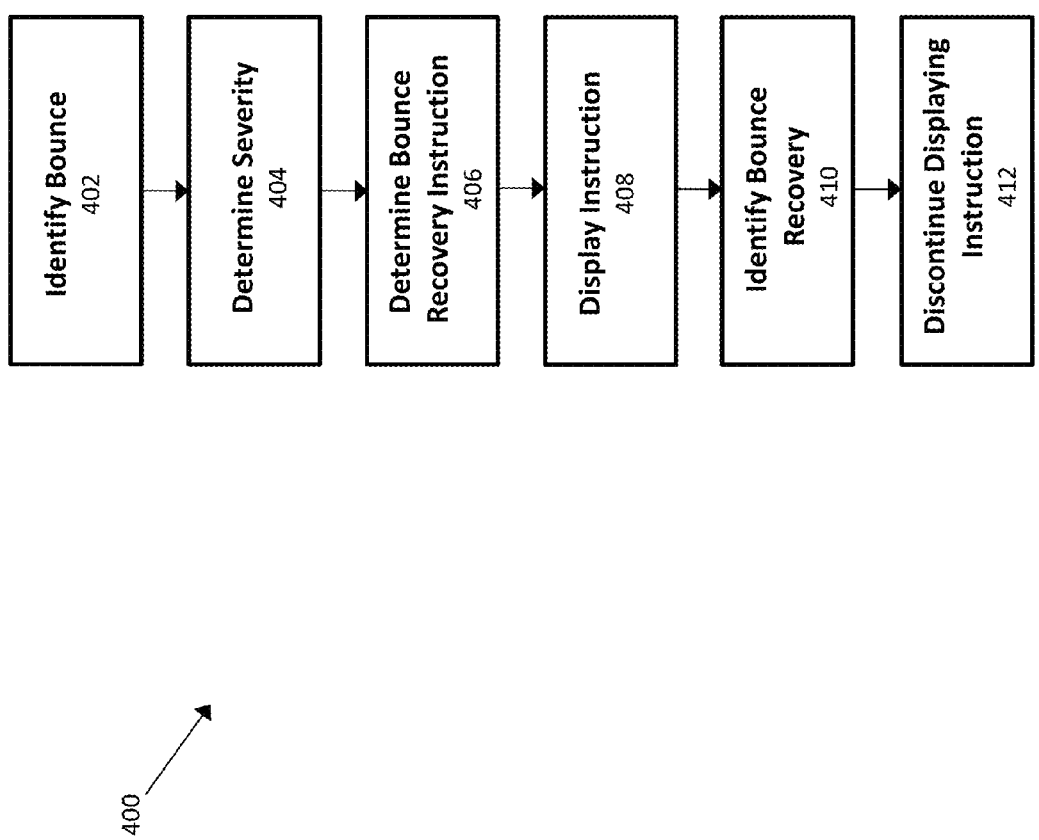
FIG. 4 depicts a method for detecting an aircraft bounce and providing instructions for recovering from the bounce, in accordance with an embodiment.

FIG. 4 depicts a method 400 for detecting an aircraft bounce and providing instructions for recovering from the bounce, in accordance with an embodiment. Advantageously, method 400 may reduce bounce related accidents by reducing reliance on pilot skill to properly recover the aircraft. In some embodiments, method 400 may be utilized in conjunction with method 200 described above.

Method 400 includes identifying 402 a bounce of an aircraft. In some embodiments, the aircraft bounce may be identified by detecting an increase in aircraft acceleration, detecting an upward aircraft speed, detecting an increase in aircraft altitude, or detecting loss of contact between aircraft landing gear and a runway. In some variations, a bounce may be identified by comparing an aircraft parameter to a threshold. In this way, incidental and non-threatening bounces may be ignored.

Method 400 includes determining 404 a severity of the bounce. This may advantageously allow for identifying an appropriate instruction. In some embodiments, the severity of the bounce is determined by determining an aircraft acceleration has exceeded an acceleration threshold, determining an upward aircraft speed has exceeded a speed threshold, or determining an increase in aircraft altitude has exceeded an altitude threshold.

Based upon the severity of the bounce, method 400 determines 406 a bounce recovery instruction. In some embodiments, additional parameters may be used to determine the instruction including, but not limited to, weather conditions, aircraft conditions, runway conditions, etc. The bounce recovery instruction may include one of "maintain current pitch" or "alter pitch." The alter pitch instruction may take the form of a nose-down or nose-up command, or any instruction resulting in a modification to aircraft pitch. In some embodiments, the bounce recovery instruction includes displaying a go-around instruction.

Method 400 then displays 408 the instruction. In some embodiments, the bounce recovery instruction is displayed on a heads-up display or a primary flight display.

Method 400 includes identifying 410 bounce recovery and discontinuing 412 displaying of the bounce recovery instruction. Identifying bounce recovery and discontinuing display of the bounce recovery instruction may advantageously allow a pilot to return focus to safely landing an aircraft. In some embodiments, identifying bounce recovery includes detecting a go-around maneuver or detecting contact between aircraft landing gear and a runway.

In some embodiments, method 400 may include providing a deflare pitch command after identifying bounce recovery. In some embodiments, the deflare pitch command is provided by method 200.

Figure 5:
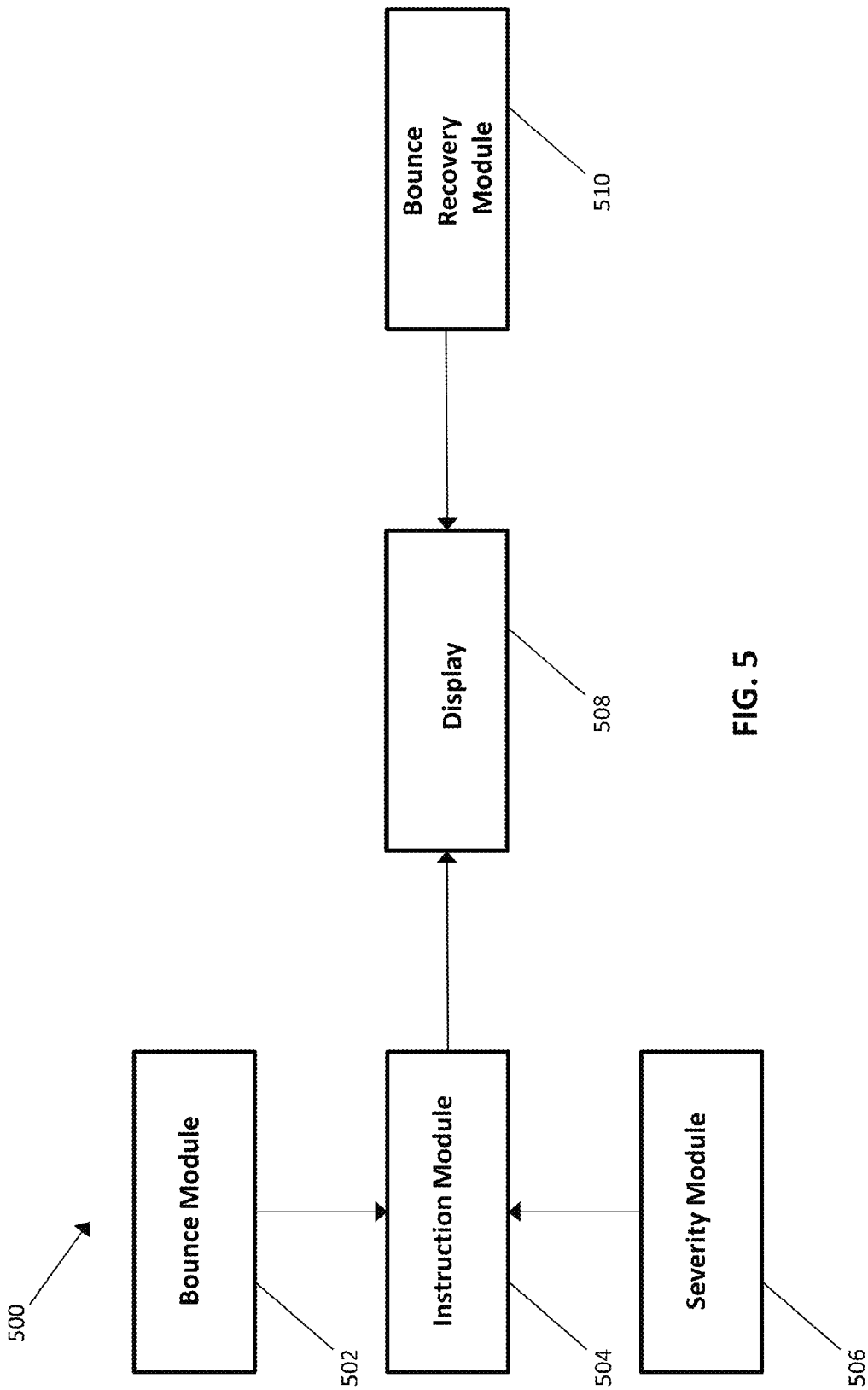
FIG. 5 depicts a system for detecting an aircraft bounce and providing instructions for recovering from the bounce, in accordance with an embodiment.

FIG. 5 depicts a system 500 for detecting an aircraft bounce and providing instructions for recovering from the bounce, in accordance with an embodiment. Advantageously, system 500 may reduce bounce related accidents by reducing reliance on pilot skill to properly recover the aircraft. In some embodiments, system 500 may be utilized in conjunction with system 300 described above.

System 500 includes a bounce module 502, an instruction module 504, a severity module 506, a display 508, and a bounce recovery module 510. Bounce module 502 may identify an aircraft bounce. Severity module 506 may determine a severity of the bounce. Instruction module 506 may determine a bounce recovery instruction based upon the severity of the bounce. In some embodiments, the bounce recovery instruction is "maintain current pitch" or "alter pitch." Display 508 displays the instruction, and discontinues display of the instruction when the bounce recovery module 510 identifies that the aircraft has recovered from the bounce.

In some embodiments, bounce module 502 detects at least one of: an increase in aircraft acceleration, an upward aircraft speed, an increase in aircraft altitude, or a loss of contact between aircraft landing gear and a runway.

In some embodiments, severity module 506 determines at least one of: an aircraft acceleration has exceeded an acceleration threshold, an upward aircraft speed has exceeded a speed threshold, and an increase in aircraft altitude has exceeded an altitude threshold. In some embodiments, a bounce may be identified by comparing an aircraft parameter to a threshold. In this way, incidental and non-threatening bounces may be ignored.

In some embodiments, bounce recovery module 510 detects at least one of a go-around maneuver and contact between aircraft landing gear and a runway In some embodiments, system 500 includes an additional module (not shown) that displays a pitch command after bounce recovery module 510 identifies bounce recovery.

In some embodiments, display 508 is a heads-up display or a primary flight display.

In some embodiments, system 500 may include a deflare pitch command module that is utilized after identifying bounce recovery. In some embodiments, the deflare pitch command module includes system 300.

In some embodiments, the instruction module 504 issues a go-around instruction. In some embodiments, the alter pitch instruction may take the form of a nose-down or nose-up command, or any instruction resulting in a modification to aircraft pitch. In some embodiments, additional parameters may be used to determine an instruction including, but not limited to, weather conditions, aircraft conditions, runway conditions, etc.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A pitch command display method comprising:
    identifying an aircraft touchdown comprising determining that landing gear of an aircraft has touched a runway,
    identifying a first value representing an actual aircraft pitch reduction rate,
    identifying a second value representing a target aircraft pitch reduction rate,
    determining a difference between the first value and the second value, and
    displaying a pitch command when an aircraft touchdown is identified and the difference between the first value and second value is greater than a threshold amount.

2. The method of claim 1, wherein displaying the pitch command comprises displaying the pitch command on a heads-up display or a primary flight display.

3. The method of claim 1 comprising identifying an elapsed time since aircraft touchdown, wherein displaying the pitch command comprises displaying the pitch command when the elapsed time is identified.

4. The method of claim 1, wherein the target aircraft pitch reduction rate is 1 degree per second.

5. The method of claim 1, wherein the pitch command is a nose-down pitch command.

6. The method of claim 1 comprising
    identifying nose gear contact with the runway and
    discontinuing display of the pitch command when nose gear contact is identified.

7. The method of claim 6 wherein the second value changes after aircraft touchdown is identified and before nose-gear contact with the runway is identified.

8. The method of claim 1 comprising
    identifying an aircraft bounce,
    determining a bounce severity,
    displaying a bounce recovery instruction based on the bounce severity, the bounce recovery instruction indicating that aircraft pitch should be maintained or that aircraft pitch should be altered,
    identifying a bounce recovery, and
    discontinuing display of the bounce recovery instruction.

9. The method of claim 8, wherein identifying an aircraft bounce comprises at least one of: detecting an increase in aircraft acceleration, detecting an upward aircraft speed, detecting an increase in aircraft altitude, and detecting a loss of contact between an aircraft landing gear and a runway.

10. The method of claim 8, wherein determining a bounce severity comprises determining at least one of: an aircraft acceleration in excess of an acceleration threshold, an upward aircraft speed in excess of a speed threshold, and an increase in aircraft altitude in excess of an altitude threshold.

11. The method of claim 8, wherein identifying a bounce recovery comprises one of detecting a go-around maneuver and detecting contact between an aircraft landing gear and a runway.

12. The method of claim 8 comprising displaying a pitch command after identifying a bounce recovery.

13. The method of claim 8, wherein displaying the bounce recovery instruction comprises displaying a go-around instruction.

14. The method of claim 1, wherein identifying the second value is based on at least one of aircraft flap position, aircraft slat position, and aircraft spoiler position.

15. A pitch command display system comprising:
  a first module that identifies an aircraft touchdown, wherein identifying an aircraft touchdown comprises determining that landing gear of an aircraft has touched a runway,
  a second module that identifies an actual aircraft pitch reduction rate,
  a third module that identifies a target aircraft pitch reduction rate,
  a pitch command module that determines a difference between the actual aircraft pitch reduction rate and the target aircraft pitch reduction rate, and that provides a pitch command when an aircraft touchdown is identified and the difference between the actual aircraft pitch reduction rate and the target aircraft pitch reduction rate is greater than a threshold amount, and
  a display that displays the pitch command.

16. The system of claim 15, wherein the third module identifies the target aircraft pitch reduction rate based on at least one of an aircraft flap position, an aircraft slat position, and an aircraft spoiler position.

17. The system of claim 15, wherein the display comprises a heads-up display or a primary flight display.

18. The system of claim 15 comprising a tenth module that identifies an elapsed time since aircraft touchdown, and wherein the display displays the pitch command after the tenth module identifies the elapsed time.

19. The system of claim 15, wherein the target aircraft pitch reduction rate is 1 degree per second.

20. The system of claim 15, wherein the pitch command is a nose-down pitch command.

21. The system of claim 15 comprising a fourth module that identifies when the nose gear has made contact with the runway and wherein the pitch command module discontinues providing the pitch command when the nose gear has made contact with the runway.

22. The system of claim 21, wherein the third module identifies at least two target aircraft pitch reduction rates after the first module identifies an aircraft touchdown and before the fourth module identifies the nose-gear has made contact with the runway.

23. The system of claim 15 comprising
  a fifth module that identifies an aircraft bounce,
  a sixth module that determines a bounce severity,
  a seventh module that determines a bounce recovery instruction based on the bounce severity, the bounce recovery instruction indicating that aircraft pitch should be maintained or that aircraft pitch should be altered, and
  an eighth module that identifies a bounce recovery, wherein the display displays the instruction and discontinues display of the instruction when the eighth module identifies a bounce recovery.

24. The system of claim 23, wherein the fifth module detects at least one of: an increase in aircraft acceleration, an upward aircraft speed, an increase in aircraft altitude, or a loss of contact between an aircraft landing gear and a runway.

25. The system of claim 23, wherein the sixth module determines at least one of: an aircraft acceleration in excess of an acceleration threshold, an upward aircraft speed in excess of a speed threshold, and an increase in aircraft altitude in excess of an altitude threshold.

26. The system of claim 23, wherein the eighth module detects at least one of a go-around maneuver and contact between an aircraft landing gear and a runway.

27. The system of claim 23 comprising a ninth module that displays a pitch command after the eighth module identifies a bounce recovery.

28. The system of claim 23, wherein the bounce recovery instruction comprises a go-around instruction.

29. A pitch command display system comprising:
  a first module that identifies an aircraft touchdown,
  a second module that identifies an actual aircraft pitch reduction rate,
  a third module that identifies a target aircraft pitch reduction rate,
  a pitch command module that determines a difference between the actual aircraft pitch reduction rate and the target aircraft pitch reduction rate, and that provides a pitch command when an aircraft touchdown is identified and the difference between the actual aircraft pitch reduction rate and the target aircraft pitch reduction rate is greater than a threshold amount,
  a fourth module that identifies an elapsed time since aircraft touchdown, and
  a display that displays the pitch command after the fourth module identifies the elapsed time.

30. The system of claim 29, wherein the display comprises a heads-up display or a primary flight display.

31. The system of claim 29, wherein the pitch command is a nose-down pitch command.

32. The system of claim 29 comprising
  a fifth module that identifies an aircraft bounce,
  a sixth module that determines a bounce severity,
  a seventh module that determines a bounce recovery instruction based on the bounce severity, the bounce recovery instruction indicating that aircraft pitch should be maintained or that aircraft pitch should be altered, and
  an eighth module that identifies a bounce recovery, wherein the display displays the instruction and discontinues display of the instruction when the eighth module identifies a bounce recovery.

33. The system of claim 32, wherein the fifth module detects at least one of: an increase in aircraft acceleration, an upward aircraft speed, an increase in aircraft altitude, or a loss of contact between an aircraft landing gear and a runway.

34. The system of claim 32, wherein the sixth module determines at least one of: an aircraft acceleration in excess of an acceleration threshold, an upward aircraft speed in excess of a speed threshold, and an increase in aircraft altitude in excess of an altitude threshold.

35. The system of claim 32, wherein the eighth module detects at least one of a go-around maneuver and contact between an aircraft landing gear and a runway.

36. The system of claim 32 comprising a ninth module that displays a pitch command after the eighth module identifies a bounce recovery.

37. The system of claim 32, wherein the bounce recovery instruction comprises a go-around instruction.

38. The system of claim 29, wherein the third module identifies the target aircraft pitch reduction rate based on at least one of an aircraft flap position, an aircraft slat position, and an aircraft spoiler position.

39. A pitch command display method comprising:
identifying an aircraft touchdown,
identifying a first value representing an actual aircraft pitch reduction rate,
identifying a second value representing a target aircraft pitch reduction rate,
determining a difference between the first value and the second value,
displaying a pitch command when an aircraft touchdown is identified and the difference between the first value and second value is greater than a threshold amount, and
identifying an elapsed time since aircraft touchdown, wherein displaying the pitch command comprises displaying the pitch command when the elapsed time is identified.

40. The method of claim 39, wherein displaying the pitch command comprises displaying the pitch command on a heads-up display or a primary flight display.

41. The method of claim 39, wherein the pitch command is a nose-down pitch command.

42. The method of claim 39 comprising
identifying an aircraft bounce,
determining a bounce severity,
displaying a bounce recovery instruction based on the bounce severity, the bounce recovery instruction indicating that aircraft pitch should be maintained or that aircraft pitch should be altered,
identifying a bounce recovery, and
discontinuing display of the bounce recovery instruction.

43. The method of claim 42, wherein identifying an aircraft bounce comprises at least one of: detecting an increase in aircraft acceleration, detecting an upward aircraft speed, detecting an increase in aircraft altitude, and detecting a loss of contact between an aircraft landing gear and a runway.

44. The method of claim 42, wherein determining a bounce severity comprises determining at least one of: an aircraft acceleration in excess of an acceleration threshold, an upward aircraft speed in excess of a speed threshold, and an increase in aircraft altitude in excess of an altitude threshold.

45. The method of claim 42, wherein identifying a bounce recovery comprises one of detecting a go-around maneuver and detecting contact between an aircraft landing gear and a runway.

46. The method of claim 42 comprising displaying a pitch command after identifying a bounce recovery.

47. The method of claim 42, wherein displaying the bounce recovery instruction comprises displaying a go-around instruction.

48. The method of claim 39, wherein identifying the second value is based on at least one of aircraft flap position, aircraft slat position, and aircraft spoiler position.

49. A pitch command display method comprising:
identifying an aircraft touchdown,
identifying a first value representing an actual aircraft pitch reduction rate,
identifying a second value representing a target aircraft pitch reduction rate of 1 degree per second,
determining a difference between the first value and the second value, and
displaying a pitch command when an aircraft touchdown is identified and the difference between the first value and second value is greater than a threshold amount.

50. The method of claim 49 comprising
identifying an aircraft bounce,
determining a bounce severity,
displaying a bounce recovery instruction based on the bounce severity, the bounce recovery instruction indicating that aircraft pitch should be maintained or that aircraft pitch should be altered,
identifying a bounce recovery, and
discontinuing display of the bounce recovery instruction.

51. The method of claim 50, wherein identifying an aircraft bounce comprises at least one of: detecting an increase in aircraft acceleration, detecting an upward aircraft speed, detecting an increase in aircraft altitude, and detecting a loss of contact between an aircraft landing gear and a runway.

52. The method of claim 50, wherein determining a bounce severity comprises determining at least one of: an aircraft acceleration in excess of an acceleration threshold, an upward aircraft speed in excess of a speed threshold, and an increase in aircraft altitude in excess of an altitude threshold.

53. The method of claim 50, wherein identifying a bounce recovery comprises one of detecting a go-around maneuver and detecting contact between an aircraft landing gear and a runway.

54. The method of claim 50 comprising displaying a pitch command after identifying a bounce recovery.

55. The method of claim 50, wherein displaying the bounce recovery instruction comprises displaying a go-around instruction.

56. The method of claim 49, wherein identifying the second value is based on at least one of aircraft flap position, aircraft slat position, and aircraft spoiler position.

57. The method of claim 49 comprising identifying an elapsed time since aircraft touchdown, wherein displaying the pitch command comprises displaying the pitch command when the elapsed time is identified.

58. The method of claim 49, wherein displaying the pitch command comprises displaying the pitch command on a heads-up display or a primary flight display.

59. The method of claim 49, wherein the pitch command is a nose-down pitch command.

60. The method of claim 49 comprising
identifying nose gear contact with the runway and
discontinuing display of the pitch command when nose gear contact is identified.

61. The method of claim 60 wherein the second value changes after aircraft touchdown is identified and before nose-gear contact with the runway is identified.

62. A pitch command display system comprising:
a first module that identifies an aircraft touchdown,
a second module that identifies an actual aircraft pitch reduction rate,
a third module that identities a target aircraft pitch reduction rate of 1 degree per second,
a pitch command module that determines a difference between the actual aircraft pitch reduction rate and the target aircraft pitch reduction rate, and that provides a pitch command when an aircraft touchdown is identified and the difference between the actual aircraft pitch reduction rate and the target aircraft pitch reduction rate is greater than a threshold amount, and
a display that displays the pitch command.

63. The system of claim 62 comprising
a fifth module that identifies an aircraft bounce,
a sixth module that determines a bounce severity,
a seventh module that determines a bounce recovery instruction based on the bounce severity, the bounce recovery instruction indicating that aircraft pitch should be maintained or that aircraft pitch should be altered, and
an eighth module that identifies a bounce recovery, wherein the display displays the instruction and discontinues display of the instruction when the eighth module identifies a bounce recovery.

64. The system of claim 63, wherein the fifth module detects at least one of: an increase in aircraft acceleration, an upward aircraft speed, an increase in aircraft altitude, or a loss of contact between an aircraft landing gear and a runway.

65. The system of claim 63, wherein the sixth module determines at least one of: an aircraft acceleration in excess of an acceleration threshold, an upward aircraft speed in excess of a speed threshold, and an increase in aircraft altitude in excess of an altitude threshold.

66. The system of claim 63, wherein the eighth module detects at least one of a go-around maneuver and contact between an aircraft landing gear and a runway.

67. The system of claim 63 comprising a ninth module that displays a pitch command after the eighth module identifies a bounce recovery.

68. The system of claim 63, wherein the bounce recovery instruction comprises a go-around instruction.

69. The system of claim 62, wherein the third module identifies the target aircraft pitch reduction rate based on at least one of an aircraft flap position, an aircraft slat position, and an aircraft spoiler position.

70. The system of claim 62 comprising a tenth module that identifies an elapsed time since aircraft touchdown, and wherein the display displays the pitch command after the tenth module identifies the elapsed time.

71. The system of claim 62, wherein the display comprises a heads-up display or a primary flight display.

72. The system of claim 62, wherein the pitch command is a nose-down pitch command.

73. The system of claim 62 comprising a fourth module that identifies when the nose gear has made contact with the runway and wherein the pitch command module discontinues providing the pitch command when the nose gear has made contact with the runway.

74. The system of claim 73, wherein the third module identifies at least two target aircraft pitch reduction rates after the first module identifies an aircraft touchdown and before the fourth module identifies the nose-gear has made contact with the runway.

75. A pitch command display method comprising:
identifying an aircraft touchdown,
identifying a first value representing an actual aircraft pitch reduction rate,
identifying a second value representing a target aircraft pitch reduction rate,
determining a difference between the first value and the second value,
displaying a pitch command when an aircraft touchdown is identified and the difference between the first value and second value is greater than a threshold amount, and
identifying nose gear contact with the runway, and
discontinuing display of the pitch command when nose gear contact is identified.

76. The method of claim 75 comprising
identifying an aircraft bounce,
determining a bounce severity,
displaying a bounce recovery instruction based on the bounce severity, the bounce recovery instruction indicating that aircraft pitch should be maintained or that aircraft pitch should be altered,
identifying a bounce recovery, and
discontinuing display of the bounce recovery instruction.

77. The method of claim 76, wherein determining a bounce severity comprises determining at least one of: an aircraft acceleration in excess of an acceleration threshold, an upward aircraft speed in excess of a speed threshold, and an increase in aircraft altitude in excess of an altitude threshold.

78. The method of claim 76, wherein identifying a bounce recovery comprises one of detecting a go-around maneuver and detecting contact between an aircraft landing gear and a runway.

79. The method of claim 76 comprising displaying a pitch command after identifying a bounce recovery.

80. The method of claim 76, wherein displaying the bounce recovery instruction comprises displaying a go-around instruction.

81. The method of claim 76, wherein identifying an aircraft bounce comprises at least one of: detecting an increase in aircraft acceleration, detecting an upward aircraft speed, detecting an increase in aircraft altitude, and detecting a loss of contact between an aircraft landing gear and a runway.

82. The method of claim 75 comprising identifying an elapsed time since aircraft touchdown, wherein displaying the pitch command comprises displaying the pitch command when the elapsed time is identified.

83. The method of claim 75, wherein displaying the pitch command comprises displaying the pitch command on a heads-up display or a primary flight display.

84. The method of claim 75, wherein the pitch command is a nose-down pitch command.

85. The method of claim 84 wherein the second value changes after aircraft touchdown is identified and before nose-gear contact with the runway is identified.

86. The method of claim 75, wherein identifying the second value is based on at least one of aircraft flap position, aircraft slat position, and aircraft spoiler position.

87. A pitch command display system comprising:
a first module that identifies an aircraft touchdown,
a second module that identifies an actual aircraft pitch reduction rate,
a third module that identifies a target aircraft pitch reduction rate,
a pitch command module that determines a difference between the actual aircraft pitch reduction rate and the target aircraft pitch reduction rate, and that provides a pitch command when an aircraft touchdown is identified and the difference between the actual aircraft pitch reduction rate and the target aircraft pitch reduction rate is greater than a threshold amount,
a fourth module that identifies when the nose gear has made contact with the runway and wherein the pitch command module discontinues providing the pitch command when the nose gear has made contact with the runway, and
a display that displays the pitch command.

88. The system of claim 87 comprising
a fifth module that identifies an aircraft bounce,
a sixth module that determines a bounce severity,
a seventh module that determines a bounce recovery instruction based on the bounce severity, the bounce recovery instruction indicating that aircraft pitch should be maintained or that aircraft pitch should be altered, and
an eighth module that identifies a bounce recovery, wherein the display displays the instruction and discontinues display of the instruction when the eighth module identifies a bounce recovery.

89. The system of claim 88, wherein the sixth module determines at least one of: an aircraft acceleration in excess of an acceleration threshold, an upward aircraft speed in excess of a speed threshold, and an increase in aircraft altitude in excess of an altitude threshold.

90. The system of claim 88, wherein the eighth module detects at least one of a go-around maneuver and contact between an aircraft landing gear and a runway.

91. The system of claim 88 comprising a ninth module that displays a pitch command after the eighth module identifies a bounce recovery.

92. The system of claim 88, wherein the bounce recovery instruction comprises a go-around instruction.

93. The system of claim 88, wherein the fifth module detects at least one of: an increase in aircraft acceleration, an upward aircraft speed, an increase in aircraft altitude, or a loss of contact between an aircraft landing gear and a runway.

94. The system of claim 87 comprising a tenth module that identifies an elapsed time since aircraft touchdown, and wherein the display displays the pitch command after the tenth module identifies the elapsed time.

95. The system of claim 87, wherein the third module identifies the target aircraft pitch reduction rate based on at least one of an aircraft flap position, an aircraft slat position, and an aircraft spoiler position.

96. The system of claim 87, wherein the display comprises a heads-up display or a primary flight display.

97. The system of claim 87, wherein the pitch command is a nose-down pitch command.

98. The system of claim 97, wherein the third module identifies at least two target aircraft pitch reduction rates after the first module identifies an aircraft touchdown and before the fourth module identifies the nose-gear has made contact with the runway.

* * * * *